United States Patent [19]

Yokota et al.

[11] Patent Number: 4,548,983

[45] Date of Patent: Oct. 22, 1985

[54] METHOD OF MANUFACTURING SHAPED ARTICLE OF HYDROGEL

[75] Inventors: Mitsuru Yokota; Shuji Fujioka; Tsutomu Goshima; Hideki Kenjo; Kazushige Komaki, all of Otsu, Japan

[73] Assignee: Toray Industries, Inc., Tokyo, Japan

[21] Appl. No.: 623,261

[22] Filed: Jun. 21, 1984

[30] Foreign Application Priority Data

Jun. 24, 1983 [JP] Japan ................................. 58-112694
Jun. 27, 1983 [JP] Japan ................................. 58-114305

[51] Int. Cl.$^4$ ............................................... C08K 5/34
[52] U.S. Cl. .................................... 524/726; 524/558; 524/742; 524/746; 523/106
[58] Field of Search ............... 524/726, 558, 742, 746; 523/106

[56] References Cited

U.S. PATENT DOCUMENTS 3,575,946  4/1971  Chromecek et al. ............... 524/558
4,379,864  4/1983  Gallop ................................. 524/558

Primary Examiner—Paul R. Michl
Assistant Examiner—A. H. Walker
Attorney, Agent, or Firm—Armstrong, Nikaido, Marmelstein & Kubovcik

[57] ABSTRACT

A method for the manufacture of shaped article of hydrogel is provided. This shaped article of hydrogel is obtained by the polymerization in a mold of a mixture comprising:

A. an alkylene glycol mono(meth)acrylate or a monomer mixture consisting preponderantly of an alkylene glycol mono(meth)acrylate, B. a polymer synthesized from a component A and possessing a polymerizable double bond in the molecular unit thereof, C. a water-soluble dipolar aprotic solvent, and D. at least one member selected from the group consisting of (a) water-soluble organic acids, (b) surface active agents, and (c) water-soluble organic substances which are poor solvents or non-solvents of the component B, and having the weight ratio of the component A to the component B in the range of 45:55 to 20:80.

12 Claims, No Drawings

METHOD OF MANUFACTURING SHAPED ARTICLE OF HYDROGEL

BACKGROUND

This invention relates to a method of manufacturing a shaped article of hydrophilic hydrogel insoluble in water. The shaped articles of this hydrogel are mainly used as medical materials.

In recent years, the application of high molecular weight materials to the medical field has become a subject of active study. Among other high molecular weight materials, hydrogels which are insoluble in water and yet hydrophilic have come to attract increasing attention because of their permeability to various substances (gases, ions, molecules, etc.) and their ability to contain water. In fact, they have now come to be used as various separation membranes, catheters, soft contact lenses, blood preserving containers, cell cultivating substrates, blood circulating paths, and embedding substrates such as for enzymes and medicines.

For such purposes as mentioned above, hydrogels which are based on such compounds as alkylene glycol mono(meth)acrylates and (meth)acrylic acids have been preponderantly used. Numerous methods have been proposed for the production of such hydrogels. Particularly as methods for manufacturing shaped articles of hydrogels with high repeatability, for example U.S. Pat. No. 3,660,545 discloses a process for producing a contact lens by polymerizing a glycol ester of (meth)acrylic acid in a rotating mold, U.S. Pat. Nos. 4,121,896 and 4,108,364 disclose a process for producing a soft contact lens by polymerizing a monomer mixture in a two-piece mold while having a flexible rim component attached to either of the two pieces of said mold, U.S. Pat. No. 4,347,198 discloses a process for molding a contact lens by filling an original solution in a space between a concave and a convex mold and gelling said original solution.

For any method which prepares a shaped article of hydrogel within a mold, the most important thing is how to remove the cast product from the mold. Particularly when the casting is carried out by solution polymerization in a mold, the manner of the removal of the cast product poses itself an important problem because the gel in a state containing a solvent has low strength. Further when a shaped article is desired to be cast of a hydrogel containing a hydroxyl group or carboxyl group in the molecular unit thereof, the cast product in the process of being removed from the mold tends to sustain damage because the hydroxyl group or carboxyl group interacts strongly with the surface of the xold.

As a solution to this problem, U.S. Pat. No. 3,499,862 teaches a method which comprises polymerizing in a mold a monomer mixture consisting of a polyhydric alcohol ester of an α,β-unsaturated monocarboxylic acid, 0.1 to 2.0% by-weight, based on the weight of the polyhydric alcohol ester of the α,β-unsaturated monocarboxylic acid, of a crosslinking agent proper for the ester, and at least 40% by weight, based on the weight of the mixture, of an inactive liquid miscible with water, contacting to water the shaped article of hydrogel produced by the polymerization to shrink in the mold after the polymerization, and removing the shrunk shaped article from the mold. In the specification of this U.S. patent, however, there is a statement to the effect that if the amount of the inactive liquid is less than 40%, the shaped article of hydrogel is swollen at at the detriment of the optical property thereof when this article is washed with water so that this method produces the shaped article of hydrogel in a size invariably smaller than the size of the mold.

SUMMARY

An object of this invention is to provide a method which produces a shaped article of hydrogel free from strain with high repeatability and which permits the shaped article to be easily removed from the mold without any sacrifice of the optical property and the mechanical property.

Specifically, this invention relates to a method of manufacturing a shaped article of hydrogel by the polymerization in a mold of a mixture consisting of:

A. an alkylene glycol mono(meth)acrylate or a monomer mixture consisting preponderantly of an alkylene glycol (meth)acrylate, B. a polymer synthesized from the component A and containing a polymerizable double bond in the molecular unit thereof, C. a water-soluble dipolar aprotic solvent, and D. at least one member selected from the group consisting of (a) water-soluble organic acids, (b) surface active agents, and (c) organic substances which are poor solvents or non-solvents for the component B, wherein the ratio by weight of the component A to the component B falls in the range of 45:55 to 20:80.

THE PREFERRED EMBODIMENTS

The term "alkylene glycol mono(meth)acrylate" of the component A as used in this invention means a monoester of an alkylene glycol or polyalkylene glycol with acrylic acid or methacrylic acid. The alkylene glycol mono(meth)acrylate as the component A is preferably any of the compounds represented by the following formula:

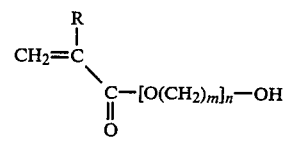

wherein R stands for a hydrogen atom or a methyl group, m for 2, 3, or 4, and n an integer selected from among 1–30.

Concrete examples of the compounds represented by this formula include mono(meth)acrylates of such alcohol as ethylene glycol, diethylene glycol, tetraethylene glycol, polyethylene glycol, propylene glycol, tetramethylene glycol, and polypropylene glycol. These compounds may be used either singly or in the form of mixtures of two or more members.

The expression "monomer mixture consisting preponderantly of alkyleneglycol mono(meth)acrylate" as used herein means a mixture of the aforementioned alkylene glycol mono(meth)acrylate with at least one member selected from the groups of monomers enumerated in (1) and (2) below:

(1) Hydrophobic monomers

Alkyl esters of (meth)acrylic acid, unsaturated nitriles such as (meth)acrylonitrile, aromatic olefins such as styrene, and vinyl compounds such as vinyl chloride and vinyl acetate.

(2) Hydrophilic monomers

Alkoxypolyethyleneglycol mono(meth)acrylates, N-vinyl lactams such as N-vinylpyrrolidone and N-vinyl piperidone, (meth)acrylic acid, (meth)acrylamide, and mono(meth)acrylates of glycerine.

These hydrophobic and hydrophilic monomers are used for the purpose of improving mechanical properties of hydrogel and increasing the water content of hydrogel. The amount of the monomer(s) to be used in the polymerization is up to 40% by weight based on the amount of the component A.

Among other monomers indicated above, at least one member selected from the group consisting of alkyl esters of (meth)acrylic acid, (meth)acrylic acid, monoesters of single-terminal alkoxypolyhydric alcohols with (meth)acrylic acid, and (meth)acrylamides can be used particularly advantageously.

The expression "polymer synthesized from the component A and containing a polymerizable double bond in the molecular unit thereof" as the component B means what is obtained by causing a monomer possessing a polymerizable double bond to react with the side chain or the terminal of either a polymer resulting from the radical polymerization of an alkylene glycol mono(meth)acrylate or a copolymer resulting from the radical polymerization of a monomer mixture consisting preponderantly of an alkylene glycol mono(meth)acrylate thereby effecting the introduction of the polymerizable double bond into the polymer or copolymer. This introduction of the double bond into the (co)polymer is desired to be effected by a polymer reaction. The term "polymer reaction" as used herein means the reaction to be caused between the functional group of the polymer and the functional group other than the double bond of the monomer used for the introduction of the double bond.

The polymer reaction in the present invention may be effected, for example, by causing the hydroxyl group of the (co)polymer resulting from the radical polymerization of the monomer of the component A to react with a compound possessing both a functional group capable of reacting with the hydroxyl group and a polymerizable double bond or by using, in the radical polymerization of the monomer of the component A, thioglycolic acid as a chain transfer agent thereby producing a polymer terminating with a carboxyl group and subsequently causing a compound possessing both a functional group capable of reacting with the carboxyl group and a polymerizable double bond to react with the aforementioned polymer containing the terminal carboxyl group.

Examples of the functional group which is capable of reacting with the hydroxyl group or carboxyl group include —COOH, —COCl, —NCO, and

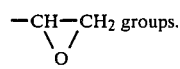 groups.

Examples of the compound possessing both such a functional group and a polymerizable double bond include (meth)acryloyl acid, (meth)acrylic acid chloride, glycidyl (meth)acrylate, and reaction products of hydroxyethyl (meth)acrylate with diisocyanate.

Now, a typical procedure to be used for synthesizing from the component A a polymer possessing a polymerizable double bond in the molecular unit (namely the component B) will be shown below.

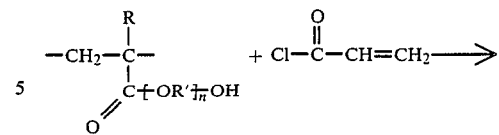

Polymer resulting from the polymerization of component A

Compound possessing both a functional group capable of reacting with OH group and a double bond

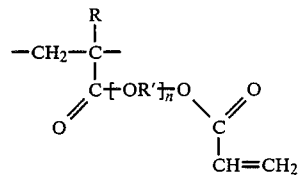

Polymer (component B) synthesized from component A and possessing a polymerizable double bond in the molecular unit The ratio of the amount of the aforementioned hydrophobic monomer and/or hydrophilic monomer to be copolymerized with the alkylene glycol mono(meth)acrylate is required to be not more than 40% by weight based on the total amount of the component A and the component B.

The amount of the double bond in the (co)polymer possessing a polymerizable double bond in the molecular unit is desired to be on the order of 1 to 40 double bonds per 1,000 monomer units making up the (co)polymer. When the double bond content exceeds the upper limit of the range mentioned above, the hydrogel consequently obtained is conspicuously deficient in mechanical properties, particularly in elongation. When absolutely no double bond is contained, the (co)polymer dissolves into water while the shaped article of hydrogel consequently obtained is undergoing a treatment for hydration, making it no longer possible to obtain the product in a desired shape. This double bond content of the (co)polymer may be determined by Fourier transform NMR, for example.

The ratio of the component A to the component B is required to fall in the range of 45:55 to 20:80 by weight. If the proportion of the component B falls short of 55% by weight, polymerization shrinkage occurs so heavily that the shaped article of hydrogel consequently obtained tends to sustain strain. The weight ratio of the two components preferably falls in the range of 45:55 to 30:70.

The organic solvent as the component C is required to be a water-soluble organic solvent which dissolves the component A and the component B to produce a clear solution and offers no obstacle to the polymerization. A water-soluble dipolar aprotic solvent ideally fulfils this requirement. Examples are dimethyl sulfoxide, N,N-dimethyl acetamide, N,N-dimethyl formamide, and N-methyl pyrrolidone.

The amount of the component C to be used is preferably in the range of 30 to 85% by weight based on the combined amount of the three components A, B and C. If the amount of the organic solvent is less than the lower limit of the range mentioned above, the mixture prepared for the polymerization possesses too high viscosity to be handled with ease. If the amount of the solvent is too much, the gel containing the solvent possesses insufficient strength and is susceptible of damage.

The component D is incorporated in the mixture for the polymerization for the purpose of facilitating the removing of the shaped article of hydrogel from the mold. It serves to either discourage or impede the interreaction between the hydroxyl group or carboxyl group in the composition making up the hydrogel and the surface of the mold. As the component D, at least one member selected from the following groups may be used.

(a) Water-soluble organic acids, represented by lower (up to $C_9$) saturated straight-chain fatty acids, lower (up to $C_{10}$) saturated dicarboxylic acids and anhydrides thereof, monooxymonocarboxylic acids such as glycolic acid and lactic acid, and oxypolycarboxylic acids such as tartaric acid and citric acid.

(b) Surface active agents, which may be nonionic, anionic, cationic, or amphoteric in type. A nonionic or an anionic surface active agent generally excels in surface activity and, therefore, serves its purpose fully in a small application rate. Thus, use of a nonionic surface active agent or an anionic surface active agent proves advantageous for the present invention.

(c) Water-soluble organic substances which are poor solvents or non-solvents for the component B.

Where the component B is a polymer synthesized from an alkylene glycol mono(meth)acrylate and possessing a polymerizable double bond in the molecular unit thereof, for example, the organic substance answering the description given above is one member selected from the group consisting of ethers such as 1,4-dioxane and tetrahydrofuran and alcohols such as glycerin and polyethylene glycol.

The concrete examples of the component D enumerated above may be used either singly or in the form of mixtures of two or more members. The amount of the component D to be incorporated in the mixture is preferably in the range of 0.01 to 10% by weight based on the combined amount of the solution for the production of hydrogel, comprising the components A, B, C and D, optionally with the addition of a crosslinking agent and a polymerization initiator. Particularly when a surface active agent is selected as the component D, it is desired to be used in an amount of not more than 1%. If the surface active agent is used in excess of this limit, the solution during the process of displacement of the ambient air with an inactive gas effervesces so heavily as to hinder the treatment. Depending on the kind of the organic substance selected as the component D from the group (c), the component D can cause the prepared solution to be cloudy even when the amount of the component D used is less than 10% by weight. In this case, the amount must be adjusted so that the solution will be obtained in a transparent state.

This invention permits use of a crosslinking agent in the mixture when necessary. As generally used in the production of any hydrogel, this crosslinking agent is only required to be a monomer which has at least two polymerizable double bonds within the molecular unit. Examples are di- or tri-vinyl compounds, di- or tri-allyl compounds, and allyl-vinyl compounds. The amount of the crosslinking agent to be used in the mixture is preferably in the range of 0.02 to 2% by weight based on the amount of the component A.

This invention further permits use of a polymerization initiator in the mixture when necessary. Any of the polymerization initiators used generally for polymerization can be adopted. Examples are azo-compounds and peroxides.

A homogeneous solution of the components, A, B, C and D, optionally with the addition of a crosslinking agent and a polymerization initiator, is poured into a mold of a desired shape and polymerized by the agency of heat, light, or radiation, for example. After completion of the polymerization, the mold containing a shaped crosslinked polymer is immersed in a mixed solution of water and a water-soluble solvent.

Any water-soluble organic solvent may be used in the mixed solution, solely on the condition that this organic solvent is capable of swelling the hydrogel. Examples of the organic solvent fulfilling this requirement are dimethyl sulfoxide, N,N-dimethyl acetamide, N,N-dimethyl formamide, N-methyl pyrrolidone, propylene glycol, methanol, and ethanol. The swelling ability of the said mixed solution for the hydrogel widely varies with the kind of the organic solvent, the concentration of the organic solvent, the temperature of the mixed solution, the composition of the hydrogel, etc. For example, the ratio of the linear dimension of the hydrogel in a varying organic solvent vs. the linear internal dimension of the mold measured for a hydrogel of a crosslinked polymer consisting of 42 parts of a polymer synthesized from 2-hydroxyethyl methacrylate and possessing a polymerizable double bond in the side chain thereof, 32 parts of 2-hydroxyethyl methacrylate, and 0.32 part of trimethylol propane trimethacrylate is as shown in Table 1.

TABLE 1

| Organic solvent and ratio of linear dimension of hydrogel | |
|---|---|
| Organic solvent | Ratio of linear dimension of hydrogel in organic solvent/ linear internal dimension of mold |
| Dimethyl sulfoxide | About 2.2 |
| N,N—dimethyl acetamide | About 2.3 |
| N,N—dimethyl formamide | About 2.2 |
| Isopropyl alcohol | About 1.2 |
| Ethanol | About 1.3 |
| Methanol | About 1.8 |

(Note) The temperarure of measurement is 20° C.

The ratio of linear dimensions increases, as shown in Table 2, in accordance as the concentration of the organic solvent in the said mixed solution increases.

TABLE 2

| Concentration of organic solvent in mixed solution and ratio of linear dimensions (using the same hydrogel composition as in Table 1) | |
|---|---|
| Concentration of organic solvent (dimethyl sulfoxide) | Ratio of linear dimensions |
| 0% by weight | 1 |
| 20% by weight | About 1.15 |
| 40% by weight | About 1.4 |
| 60% by weight | About 1.7 |
| 80% by weight | About 2.0 |
| 100% by weight | About 2.2 |

(Note) The temperature of measurement is 20° C.

The ratio of linear dimensions increases, as shown in Table 3, in accordance as the temperature of the solution increases.

TABLE 3

Temperature of solution and ratio of linear dimensions (using the same hydrogel composition as in Table 1)

| Temperature of solution (aqueous 20% dimethyl sulfoxide solution) | Ratio of linear dimensions |
| --- | --- |
| 20° C. | About 1.15 |
| 35° C. | About 1.2 |
| 50° C. | About 1.3 |
| 60° C. | About 1.38 |
| 70° C. | About 1.43 |

For a fixed concentration of the organic solvent in the solution, the ratio of linear dimensions is variable with the composition of the gel. In the case of a hydrogel which contains methyl methacrylate in addition to 2-hydroxyethyl methacrylate, for example, the ratio of linear dimensions is smaller than that of a hydrogel consisting solely of 2-hydroxyethyl methacrylate.

The various parameters (temperature and kind and concentration of organic solvent) concerning the mixed solution of a water-soluble organic solvent and water to be used in this invention are determined as indicated below. First, the temperature is required to be not lower than the temperature of the polymerization in the mold, preferably to be about 5° C. higher than the temperature of the polymerization. As regards the kind of the organic solvent, any organic solvent may be used insofar as the organic solvent is capable of swelling the hydrogel. When the production of the hydrogel in the mold is effected in the form of solution polymerization, one and the same organic solvent can be advantageously used. When the kind of the organic solvent, the temperature, of the mixed solution, and the composition of hydrogel to be obtained are fixed, then the concentration of the organic solvent at which the linear dimension of the hydrogel falls in the range of 1.0 to 1.8 times the linear internal dimension of the mold will be experimentally determined. If the organic solvent swells the hydrogel to any linear dimension exceeding the upper limit of the range mentioned above, the hydrogel may suffer destruction of its reticular structure and impairment in mechanical properties such as tensile strength and elongation.

When the mold is immersed in the mixed solution of water and the organic solvent, it is held therein at a fixed temperature for several hours. When the die in use happens to be a two-piece type, the die pieces is separated from each other after several hours' standing subsequent to the immersion and again are immersed in the mixed solution. In the bath, the shaped article separates itself from the mold owing to the swelling pressure of the gel itself. When the mold in use happens to be provided with an opening, the treatment of the immersion alone suffices for the separation of the shaped article from the mold. When the two-piece mold is used, it is a good practice to keep the concentration of the organic solvent at a level giving a ratio of linear dimensions near 1.0 until the mold pieces are separated from each other and, after the mold has been separated, to increase the concentration enough to increase the ratio of linear dimensions.

The effects brought about by the present invention are as follows.

(1) The separation of the shaped article from the mold is effected by the swelling pressure of the shaped article itself in the mixed solution of the organic solvent and water. Even when the gel contains a solvent and possesses insufficient strength, it can still be separated without suffering any damage.

(2) Since the mold containing the shaped article is immersed in the mixed solution of the organic solvent and water, the separation of the shaped article from the mold is not affected by the proportion of the solvent contained in the solution of mixture to be polymerized in the mold. As the result, this separation can be accomplished without reference to the final linear dimension of the shaped article of hydrogel relative to the linear internal dimension of the mold. In other words, even when the proportion of the inactive liquid in the mixture exceeds 40% and the dimensions of the shaped article of hydrogel in water are smaller than those of the internal space of mold as indicated in U.S. Pat. No. 3,499,862, this shaped article can be easily swollen and removed from the mold by the mixed solution of the organic solvent and water. The separation is accomplished at no sacrifice of optical properties or mechanical properties.

In accordance with the present invention, shaped articles of hydrogel can be obtained in desired shapes in high yields. Thus, the present invention can be advantageously utilized for the production of soft contact lenses, catheters, substrates for cell cultivation, blood circulating paths, and various separation membranes.

Now, this invention will be described more specifically below with reference to working examples. Wherever parts are mentioned in the working examples, they are meant as parts by weight.

EXAMPLE 1

A solution of 90 parts of 2-hydroxyethyl methacrylate in 360 parts of N,N-dimethyl acetamide was subjected to polymerization in the presence of 0.09 part of azo-bis-dimethyl valeronitrile as a polymerization initiator in an atmosphere of nitrogen under the conditions of 50° C. for five hours, 55° C. for two hours, and 80° C. for two hours. The resultant solution was cooled to 20° C. This solution was kept stirred and 0.72 part of methacryloyl chloride was added thereto and the mixture was left reacting for four hours, with 0.55 part of pyridine used as a hydrochloric acid trapping agent. The solution resulting from this reaction was poured in 1,4-dioxane to cause precipitation of the polymer of 2-hydroxyethyl methacrylate having a polymerizable double bond in the molecular unit thereof and removal of impurities. The conversion determined based on the weight of the sufficiently dried polymer was about 70%. The content of the polymerizable double bond determined by Fourier transform NMR was about 5 on the average per 1000 molecules of 2-hydroxyethyl methacrylate.

By dissolving 26 parts of the polymer possessing the polymerizable double bond in the molecular unit thereof, 16 parts of 2-hydroxyethyl methacrylate, 0.16 part of trimethylol propane trimethacrylate, and 0.016 part of azo-bis-dimethyl valeronitrile in 55.1 parts of dimethyl sulfoxide and 2.9 parts of glycerin a clear solution was obtained. In an atmosphere of nitrogen, this solution was cast in the shape of a soft contact lens desired to be produced in the space between the concave and the convex mold, placed in an electric oven, and heated evenly from 40° C. to 85° C. over a period of five hours for polymerization. After completion of the polymerization, the die was immersed in an aqueous 16% dimethyl sulfoxide solution at 90° C., with due care taken not to cool the die. When the concave and the convex molds were separated from each other, the produced gel in the shape of a lens remained on one of them. The mold and the gel adhering thereto were further heated as immersed in the aqueous solution at 90° C., with dimethyl sulfoxide added to a total concentration of 20%. After four hours' standing, the gel swelled and spontaneously separated from the mold and floated up. The gel was heated in an aqueous physiological salt solution to effect removal of the solvent and the residual monomers and hydration of the gel. Consequently, there was obtained a soft contact lens. This lens was transparent and free from all physical defects. The size of this lens in the aqueous 16% dimethyl sulfoxide solution at 90° C. was about 1.05 times and that of the lens in the aqueous 20% dimethyl sulfoxide solution was about 1.5 times respectively the internal size of the mold.

EXAMPLES 2 and 3

The procedure of Example 1 was repeated, except that citric acid and polyethylene glycol #400 respectively were used in the place of glycerine. In either experiment, there was obtained a lens having no optical defect.

COMPARATIVE EXPERIMENT 1

The procedure of Example 1 was repeated, except that the addition of 2.9 parts of glycerine was omitted and the amount of dimethyl sulfoxide was changed from 55.1 parts to 58 parts. After completion of the polymerization, the mold was heated as immersed in an aqueous 5% NaCl solution in the place of the aqueous 16% dimethyl sulfoxide solution. When the concave and the convex molds were separated from each other, they adhered so powerfully to each other that use of force was necessary. The mold and the gel adhering thereto were continuously heated as immersed in the aqueous solution. Even after eight hours' standing in that condition, the gel would not come off the mold. When this gel was removed with a finger tip, it readily sustained scratches. The size of the lens in the aqueous NaCl solution at 90° C. was found to be about 0.9 times the size of the internal space of mold.

COMPARATIVE EXPERIMENT 2

The procedure of Example 1 was repeated, except that in the composition of the solution for polymerization, the amount of the polymer possessing a polymerizable double bond in the molecular unit thereof and the amount of 2-hydroxyethyl methacrylate were changed respectively from 26 parts to 16 parts and from 16 parts to 26 parts. The gel consequently produced in the mold swelled and came off the mold. The lens thus obtained, however, contained optical defects in the form of streaks and spirals. These defects could not be removed even by a boiling treatment.

EXAMPLE 4

A solution of 50 parts of methyl methacrylate, 50 parts of 2-hydroxyethyl methacrylate, and 5 parts of methacrylic acid in 700 parts of 1,4-dioxane was polymerized in the presence of 0.42 part of azo-bis-dimethyl valeronitrile in an atmosphere of nitrogen at 50° C. for eight hours. After completion of the polymerization, the solution was cooled to 20° C., then mixed with 0.9 part of methacryloyl chloride, and left reacting, with pyridine used as a hydrochloric acid trapping agent. Then the resultant solution was poured into water to cause precipitation of a copolymer having a polymerizable double bond in the molecular unit. The copolymer was recovered and dried.

By dissolving 26 parts of the polymer possessing the polymerizable double bond in the molecular unit, 20 parts of 2-hydroxyethyl methacrylate, 0.3 part of methacrylic acid, 0.2 part of trimethylol propane trimethacrylate, 1.1 parts of citric acid, and 0.2 part of azo-bis-dimethyl valeronitrile in 62 parts of dimethyl sulfoxide and 4 parts of glycerine, there was obtained a homogeneous clear solution. In an atmosphere of nitrogen, this solution was cast in the shape of a soft contact lens in the space between the concave and the convex molds, placed in an electric oven, and heated therein from 40° C. to 90° C. over a period of four hours. After completion of the polymerization, the mold was immersed in an aqueous 35% N,N-dimethyl formamide solution at 95° C. Thereafter, the procedure of Example 1 was followed. Consequently, there was obtained a lens showing absolutely no optical defect even under a magnifying glass (X10). The size of the lens in the aqueous 35% N,N-dimethyl formamide solution at 95° C. was found to be about 1.5 times the internal size of the mold.

EXAMPLE 5

By dissolving 26 parts of the polymer synthesized as described in Example 1 and possessing the polymerizable double bond in the molecular unit, 16 parts of 2-hydroxyethyl methacrylate, 0.84 part of methacrylic acid, 0.016 part of azo-bis-dimethyl valeronitrile, 0.16 part of trimethylol propane trimethacrylate, and 1.5 parts of citric acid in 58 parts of N,N-dimethyl acetamide, there was obtained a clear solution. In an atmosphere of nitrogen, this solution was cast in the space of the shape of a soft contact lens between the concave and the convex mold, placed in an electric oven, and heated therein from 40° C. to 85° C. over a period of five hours to effect polymerization. After completion of the polymerization, the mold was immersed in an aqueous 18% N,N-dimethyl acetamide solution at 90° C., with due care taken not to cool the mold. The two pieces of the mold were separated from each other. The piece of the mold and the gel adhering thereto were further heated as immersed in the aqueous solution at 90° C., with N,N-dimethyl acetamide was added to a total concentration of 22%. After six hours' standing, the gel in the shape of a lens swelled and spontaneously separated from the piece of the mold and floated up. Thereafter, the procedure of Example 1 was followed. Under a magnifying lens (x10), the produced lens showed neither optical defect nor scratch. The size of the lens in the aqueous 18% N,N-dimethyl acetamide solution at 90° C. was about 1.1 times and that in the aqueous 22% N,N-dimethyl acetamide solution at 90° C. was about 1.6 times, respectively, the internal size of the mold.

We claim:
1. A method of manufacturing a shaped article of hydrogel by:
 (1) forming a polymerizable mixture consisting essentially of:
  (A) an alkylene glycol mono(meth)acrylate or a monomer mixture consisting primarily of an alkylene glycol mono(meth)acrylate,
  (B) a preformed copolymer possessing a polymerizable double bond in the molecular structure thereof and formed by reacting: (a) a (co)polymer of an alkylene glycol mono(meth)acrylate or of a monomer mixture consisting primarily of an alkylene glycol mono(meth)acrylate, said (co)polymer possessing a hydroxyl group or a terminal carboxyl group, with (b) a monomer possessing a polymerizable double bond and a functional group which reacts with said hydroxyl group or carboxyl group, (C) a water-soluble dipolar aprotic solvent, and (D) at least one member selected from the group consisting of (a) water-soluble organic acids, (b) surface active agents, and (c) water-soluble organic substances which are poor solvents or non-solvents for the preformed copolymer (B);

the weight ratio of the component A to the preformed copolymer (B) in said polymerizable mixture being in the range of 45:55 to 20:80; and (2) polymerizing the polymerizable mixture (1) in a mold.

2. A method according to claim 1, wherein said monomer mixture consisting primarily of an alkylene glycol mono(meth)acrylate of the component A has as its major component an alkylene glycol mono(meth)acrylate and as its minor component at least one monomer selected from the group consisting of (meth)acrylic acid alkyl esters, (meth)acrylic acid, monoesters of single-terminal alkoxy polyhydric alcohols with (meth)acrylic acid, and (meth)acrylamides.

3. A method according to claim 1, wherein said monomer mixture consisting primarily of an alkylene glycol (meth)acrylate of the component A has as its major component an alkylene glycol mono(meth)acrylate and as its minor component at least one monomer selected from the group consisting of (meth)acrylic acid, monoesters of single-terminal alkoxy polyhydric alcohols with (meth)acrylic acid, and (meth)acrylamides 4. A method according to claim 1, wherein said alkylene glycol mono(meth)acrylate is represented by the following formula:

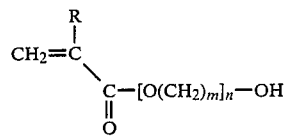

wherein R stands for a hydrogen atom or a methyl group, m for 2, 3 or 4, and n for an integer falling in the range of 1 to 30.

5. A method according to claim 1, wherein said water-soluble dipolar aprotic solvent of the component C is at least one member selected from the group consisting of dimethyl sulfoxide, N,N-dimethyl acetamide, N,N-dimethyl formamide and N-methyl pyrrolidone.

6. A method according to claim 1, wherein said weight ratio of the component A to the component B falls in the range of 45:55 to 30:70.

7. A method according to claim 1, wherein the ratio of the amount of the component C to the combined amount of the components A, B and C is in the range of to 85% by weight.

8. A method according to claim 1, wherein the ratio of the amount of the component D to the combined amount of the mixture is in the range of 0.01 to 10% by weight.

9. A method according to claim 1, wherein said mixture further comprises a crosslinking agent and a polymerization initiator.

10. A method according to claim 1, wherein said polymerization is followed by a step of immersing the mold in a mixed solution consisting of water and a water-soluble organic solvent thereby allowing the resultant shaped article of hydrogel to swell to a size falling in the range of 1.0 to 1.8 times the internal size of the mold and separate from the mold.

11. A method according to claim 10, wherein said shaped article of hydrogel is caused to swell to a size 1.05 to 1.6 times the internal size of the mold.

12. A method according to claim 1, wherein the preformed copolymer (B) contains 1–40 double bonds per 1,000 monomer units.

* * * * *